United States Patent
Marathe et al.

(10) Patent No.: US 8,700,670 B2
(45) Date of Patent: Apr. 15, 2014

(54) INSERT OPTIMIZATION FOR B+ TREE DATA STRUCTURE SCALABILITY

(75) Inventors: Shilesh Marathe, Maharashtra (IN); Rajesh Chepuri, Maharashtra (IN); Niranjan Pendharkar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 288 days.

(21) Appl. No.: 12/758,483

(22) Filed: Apr. 12, 2010

(65) Prior Publication Data

US 2011/0252067 A1  Oct. 13, 2011

(51) Int. Cl.
G06F 17/30 (2006.01)

(52) U.S. Cl.
USPC .......................................... 707/794

(58) Field of Classification Search
USPC .......................................... 707/797
See application file for complete search history.

(56) References Cited

U.S. PATENT DOCUMENTS

| | | | | |
|---|---|---|---|---|
| 5,495,609 A * | 2/1996 | Scott | ............................ | 707/696 |
| 5,560,007 A * | 9/1996 | Thai | ........................ | 707/999.002 |
| 5,644,763 A * | 7/1997 | Roy | ................................ | 715/207 |
| 6,438,562 B1 * | 8/2002 | Gupta et al. | ................... | 707/696 |
| 7,370,055 B1 * | 5/2008 | Pande | ............................ | 707/692 |
| 7,752,154 B2 * | 7/2010 | Friedlander et al. | ............ | 706/47 |
| 7,953,717 B2 * | 5/2011 | Graefe | .......................... | 707/704 |
| 2001/0042204 A1 * | 11/2001 | Blaker et al. | ....................... | 707/9 |
| 2005/0171960 A1 * | 8/2005 | Lomet | ........................... | 707/100 |
| 2008/0016107 A1 * | 1/2008 | Worrall | ......................... | 707/102 |
| 2008/0065670 A1 * | 3/2008 | Cha et al. | ....................... | 707/101 |
| 2008/0071809 A1 * | 3/2008 | Lomet | ........................... | 707/100 |
| 2009/0012976 A1 * | 1/2009 | Kang et al. | ..................... | 707/100 |
| 2009/0182709 A1 * | 7/2009 | Ritchie et al. | ..................... | 707/2 |
| 2010/0306444 A1 * | 12/2010 | Shirley et al. | ..................... | 711/6 |
| 2012/0072656 A1 * | 3/2012 | Archak et al. | ................ | 711/104 |

\* cited by examiner

*Primary Examiner* — Rehana Perveen
*Assistant Examiner* — Thuy Bui
(74) *Attorney, Agent, or Firm* — Wilmer Cutler Pickering Hale and Dorr LLP

(57) ABSTRACT

A method, in one embodiment, can include receiving a key and associated data via a computing device. Furthermore, the method can include searching a B+ tree data structure using the key to find a leaf node. The B+ tree data structure is stored by a persistent storage coupled to the computing device. The B+ tree data structure can include a first plurality of nodes that each contains a key-value entry that is not maintained in a sorted order based on its key. In addition, the key and associated data are appended to the leaf node. A sector that includes the leaf node and the key and associated data can be flushed to the persistent storage.

8 Claims, 7 Drawing Sheets

INSERT OPTIMIZATION FOR B+ TREE DATA STRUCTURE SCALABILITY

BACKGROUND

Within the conventional technology, an implementation of a B+ tree data structure can be used for creating some type of indices. For example, a larger virtual address space can be mapped to a relatively smaller physical address space. In this case, the key-value pairs in the B+ tree data structure are virtual to physical address mappings (or translations). In addition, these translations are stored in B+ tree format in order to obtain search efficiency and to keep metadata (translations) size proportional to the physical storage. There is a requirement that such B+ tree data structures should satisfy ACID (atomicity, consistency, isolation, durability) properties.

More specifically, in order to guarantee ACID properties, an implementation of the B+ tree data structure requires updates to the tree to go through a transaction mechanism. For example, the transaction mechanism involves writing to a transaction log and then replaying the transaction log. However, the transactions are costly to performance in terms of the number of inputs and outputs (I/Os) and contention that they cause for the transaction log area.

SUMMARY

A method, in one embodiment, can include receiving a key and associated data via a computing device. Furthermore, the method can include searching a B+ tree data structure using the key to find a leaf node. The B+ tree data structure is stored by a persistent storage coupled to the computing device. The B+ tree data structure can include a first plurality of nodes that each contains a key-value entry that is not maintained in a sorted order based on its key. In addition, the key and associated data are appended to the leaf node. A sector that includes the leaf node and the key and associated data can be flushed to the persistent storage. In an embodiment, the first plurality of nodes can include a plurality of non-leaf nodes of the B+ tree data structure. Additionally, in one embodiment, the first plurality of nodes can include a plurality of leaf nodes of the B+ tree data structure. Furthermore, in an embodiment, the B+ tree data structure can include a plurality of non-leaf nodes which each contain a key-value that is maintained in a sorted order based on its key and the first plurality of nodes can include a plurality of leaf nodes of the B+ tree data structure. It is pointed out that in one embodiment, the method can further include detecting a sector size of the persistent storage; and ensuring that each node of the B+ tree data structure is not larger than the sector size of the persistent storage. Moreover, in an embodiment, a node of the B+ tree data structure is larger than a sector of the persistent storage, and the B+ tree data structure can include a second plurality of nodes which each contain a key-value that is maintained in a sorted order based on its key within the sector of the persistent storage. In one embodiment, the method can further include flushing intermittently to the persistent storage a free space management structure associated with the B+ tree data structure. In addition, in an embodiment, the method can further include flushing intermittently to the persistent storage a free space management structure associated with the B+ tree data structure, wherein the flushing includes reducing a number of blocks of the free space management structure on the persistent storage, wherein a persistent storage free space management structure does not indicate a larger number of blocks to be free than the actual number of free blocks which is indicated by a non-persistent storage free space management structure.

In another embodiment, a computer readable storage medium has stored thereon, computer-executable instructions that when executed by a computing device cause the computing device to perform a method. The method includes: searching a B+ tree data structure using the key to find a leaf node. The B+ tree data structure is stored by a persistent storage coupled to the computing device. The B+ tree data structure can include a first plurality of nodes that each contains a key-value entry that is not maintained in a sorted order based on its key. In addition, the key and associated data are appended to the leaf node. A sector that includes the leaf node and the key and associated data can be flushed to the persistent storage. Furthermore, in one embodiment, the first plurality of nodes can include a plurality of non-leaf nodes of the B+ tree data structure. In an embodiment, the first plurality of nodes can include a plurality of leaf nodes of the B+ tree data structure. In addition, in one embodiment, the B+ tree data structure can include a plurality of non-leaf nodes which each contain a key-value that is maintained in a sorted order based on its key and the first plurality of nodes can include a plurality of leaf nodes of the B+ tree data structure. Moreover, in an embodiment, the method can further include detecting a sector size of the persistent storage; and ensuring that each node of the B+ tree data structure is not larger than the sector size of the persistent storage. Additionally, in one embodiment, a node of the B+ tree data structure is larger than a sector of the persistent storage, and wherein the B+ tree data structure can include a second plurality of nodes which each contain a key-value that is maintained in a sorted order based on its key within the sector of the persistent storage. In an embodiment, the method can further include flushing intermittently to the persistent storage a free space management structure associated with the B+ tree data structure. Furthermore, in one embodiment, the method can further include flushing intermittently to the persistent storage a free space management structure associated with the B+ tree data structure, wherein the flushing comprising reducing a number of blocks of the free space management structure on the persistent storage, wherein a persistent storage free space management structure does not indicate a larger number of blocks to be free than the actual number of free blocks which is indicated by a non-persistent storage free space management structure.

In yet another embodiment, a computer system includes a processor and computer readable storage media coupled to the processor and having stored therein instructions that, if executed by the computer system cause the computer system to execute a method. The method includes: receiving a key and associated data via the computer system; searching a B+ tree data structure using the key to find a leaf node, wherein the B+ tree data structure is stored by a persistent storage coupled to the computer system, wherein the B+ tree data structure comprising a first plurality of nodes that each contain a key-value entry that is not maintained in a sorted order based on its key; appending the key and associated data to the leaf node; and flushing to the persistent storage a sector comprising the leaf node and the key and associated data. In addition, in one embodiment, the first plurality of nodes can include a plurality of non-leaf nodes of the B+ tree data structure. In an embodiment, the first plurality of nodes can include a plurality of leaf nodes of the B+ tree data structure. Furthermore, in one embodiment, the B+ tree data structure can include a plurality of non-leaf nodes which each contain a key-value that is maintained in a sorted order based on its key and the first plurality of nodes can include a plurality of leaf nodes of the B+ tree data structure. In an embodiment, the method can further include detecting a sector size of the persistent storage; and ensuring that each node of the B+ tree data structure is not larger than the sector size of the persistent storage. Moreover, in one embodiment, a node of the B+ tree data structure is larger than a sector of the persistent storage, and wherein the B+ tree data structure can include a second plurality of nodes which each contain a key-value that is maintained in a sorted order based on its key within the sector of the persistent storage. Additionally, in an embodiment, the method can further include flushing intermittently to the persistent storage a free space management structure associated with the B+ tree data structure. In one embodiment, the method can further include flushing intermittently to the persistent storage a free space management structure associated with the B+ tree data structure, wherein the flushing comprising reducing a number of blocks of the free space management structure on the persistent storage, wherein a persistent storage free space management structure does not indicate a larger number of blocks to be free than the actual number of free blocks which is indicated by a non-persistent storage free space management structure.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings, which are incorporated in and form a part of this specification and in which like numerals depict like elements, are included for exemplary illustration of principles of the present embodiments and are not intended to limit the invention to the particular implementations illustrated therein. The drawings referred to in this description should not be understood as being drawn to scale except if specifically noted.

DETAILED DESCRIPTION

Figure 1:
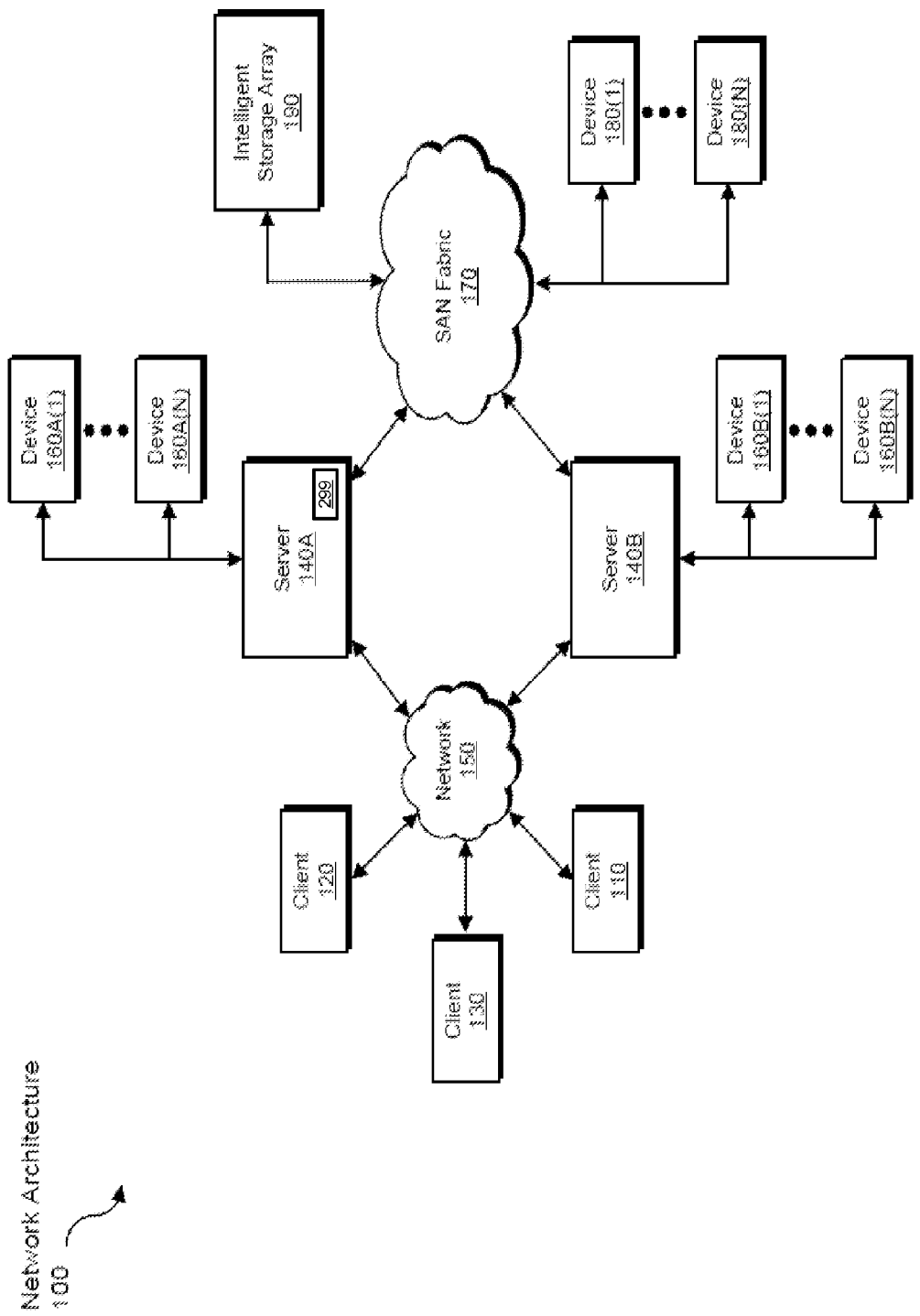
FIG. 1 is a block diagram depicting an example of a network upon which embodiments according to the present disclosure can be implemented.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "searching", "flushing", "determining," "utilizing," "requesting," "detecting," "accessing," "selecting," "sending," "monitoring," "updating," "instructing," "ensuring," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a block diagram depicting a network architecture 100 upon which embodiments of the present disclosure may be used. The network architecture 100 can include client systems 110, 120, and 130, as well as storage servers 140A and 140B (any of which can be implemented using computer system 200 of FIG. 2), which are coupled to a network 150. Storage server 140A is further depicted as having storage devices 160A(1)-(N) directly attached, and storage server 140B is depicted with storage devices 160B(1)-(N) directly attached. Storage servers 140A and 140B are also connected to a SAN (storage area network) fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

Figure 2:
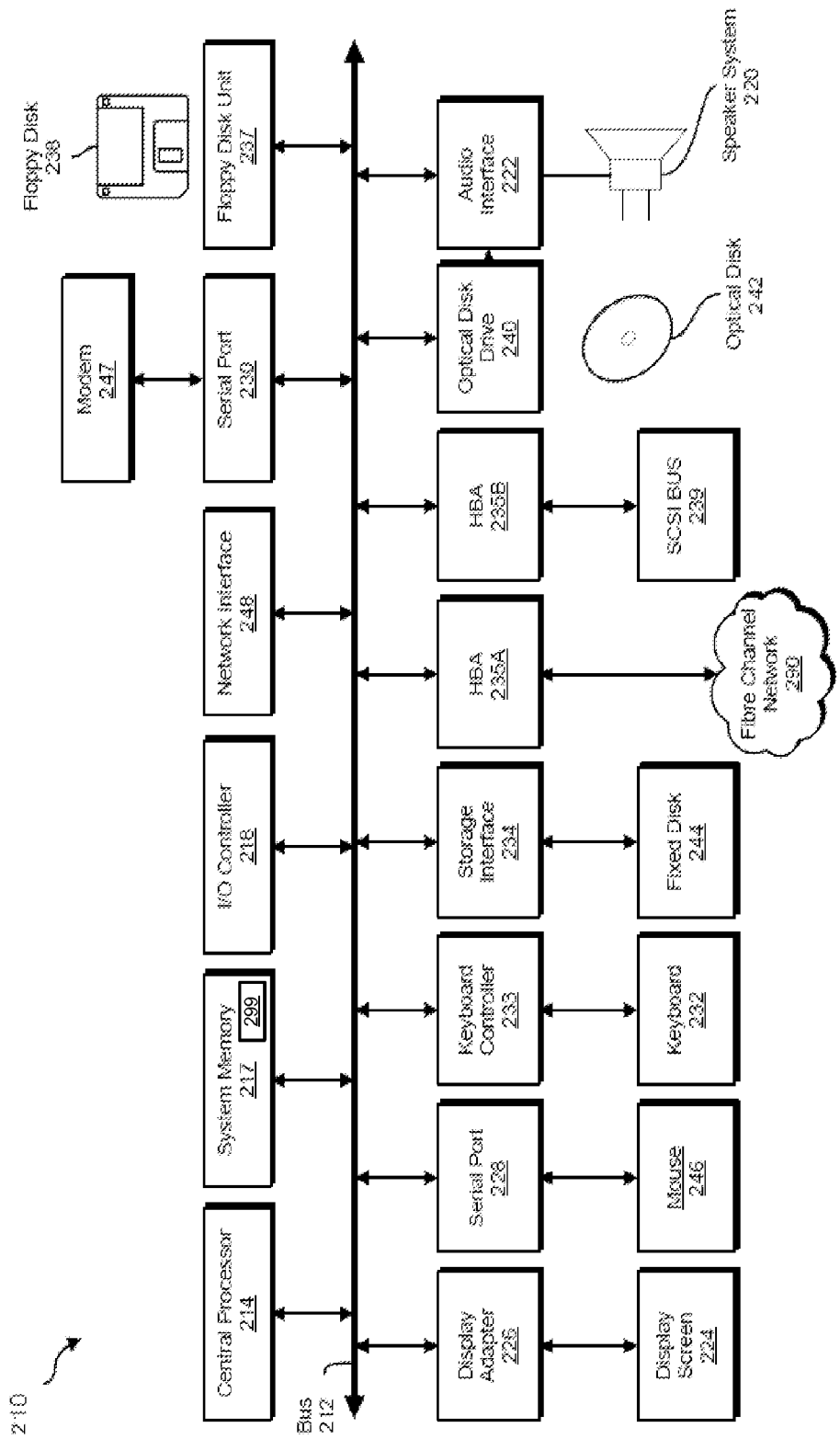
FIG. 2 is a block diagram depicting an example of a computer system upon which embodiments according to the present disclosure can be implemented.

With reference to computer system 210 of FIG. 2, modem 247, network interface 248 or some other method can be used to provide connectivity from each of client computer systems 110, 120, and 130 to network 150. Client systems 110, 120, and 130 are able to access information on storage server 140A or 140B using, for example, a web browser or other client software (not shown). Such a client allows client systems 110, 120, and 130 to access data hosted by storage server 140A or 140B or one of storage devices 160A(1)-(N), 160B(1)-(N), 180(1)-(N), or intelligent storage array 190. FIG. 1 depicts the use of a network such as the Internet for exchanging data, but the present disclosure is not limited to the Internet or any particular network-based environment.

Within FIG. 1, it is noted that one or more of the client systems 110, 120, and 130, and storage servers 140A and 140B can include a B+ tree data structure module 299 in accordance with various embodiments of the present disclosure. For example within the present embodiment, the storage server 140A can include a B+ tree data structure module 299. In one embodiment, the module 299 can cause the storage server 140A to implement one or more B+ tree data structures on one or more of the storage devices 160A(1)-(N), wherein the B+ tree data structure can include a plurality of nodes which contain key-value entries that are not maintained in a sorted order based on their key. Furthermore, in an embodiment, the module 299 can cause the storage server 140A to implement one or more B+ tree data structures in combination with one or more file systems, one or more databases, one or more thin volumes, one or more data structures, or any combination thereof, but not limited to such.

It is noted that the network architecture 100 may not include all of the elements illustrated by FIG. 1. Additionally, the network architecture 100 can be implemented to include one or more elements not illustrated by FIG. 1. It is pointed out that the network architecture 100 can be utilized or implemented in any manner similar to that described herein, but is not limited to such.

FIG. 2 depicts a block diagram of a computer system 210 suitable for implementing embodiments of the present disclosure. In the discussion to follow, various and numerous components and elements are described. Various combinations and subsets of those components can be used to implement the devices mentioned in conjunction with FIG. 1. For example, the client 110 may be a full-function computer system that employs many if not all of the features of the computer system 210. However, the storage servers 140A and 140B may utilize a subset of those features needed to support the functionality provided by those devices. For example, the storage servers 140A and 140B may not need a keyboard or display, and may execute a relatively sparse operating system that supports the functionality of data storage and data access and the management of such functionality.

In the example of FIG. 2, the computer system 210 includes a bus 212 which interconnects major subsystems of the computer system 210. These subsystems can include, but is not limited to, one or more central processors 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239; and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). In one embodiment, the modem 247, network interface 248 or some other method can be used to provide connectivity from each of the client computer systems 110, 120, and 130 to the network 150 of FIG. 1.

The bus 212 of FIG. 2 allows data communication between the central processor 214 and system memory 217, which may include non-volatile memory (e.g., read only memory (ROM), programmable ROM, flash memory, electrically erasable programmable read only memory (EEPROM), and the like) or volatile memory (e.g., random access memory (RAM), static RAM, dynamic RAM, and the like) or some combination of non-volatile memory and volatile memory. The volatile memory is generally the main memory into which the operating system and application programs are loaded. The non-volatile memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via network modem 247 or interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 2) may be connected to the computer system 210 in a similar manner (e.g., document scanners, digital cameras, and the like). Conversely, all of the devices shown in FIG. 2 need not be present to practice the present disclosure. In addition, it is noted that the devices and subsystems of the computer system 210 can be interconnected in different ways from that shown in FIG. 2.

The operation of a computer system such as that shown in FIG. 2 is readily known in the art and is not discussed in detail in this application. The operating system provided on the computer system 210 may be MS-DOS®, MS-WINDOWS®, OS/2®, UNIX®, Linux®, or another known operating system. Code to implement the present disclosure can be stored in computer-readable storage media such as one or more of the system memory 217, fixed disk 244, optical disk 242, or floppy disk 238. For example, the system memory 217 is shown storing a B+ tree data structure module 299 in accordance with various embodiments of the present disclosure. However, the B+ tree data structure module 299 can also be stored in computer-readable storage media such as one or more of the system memory 217, fixed disk 244, optical disk 242, or floppy disk 238. It should further be noted, that in an embodiment, the computer system 210 can have some, most, or all of its functionality supplanted by a distributed computer system having a large number of dispersed computing nodes, as would be the case where the functionality of the computer system 210 is partly or wholly executed using a cloud computing environment.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
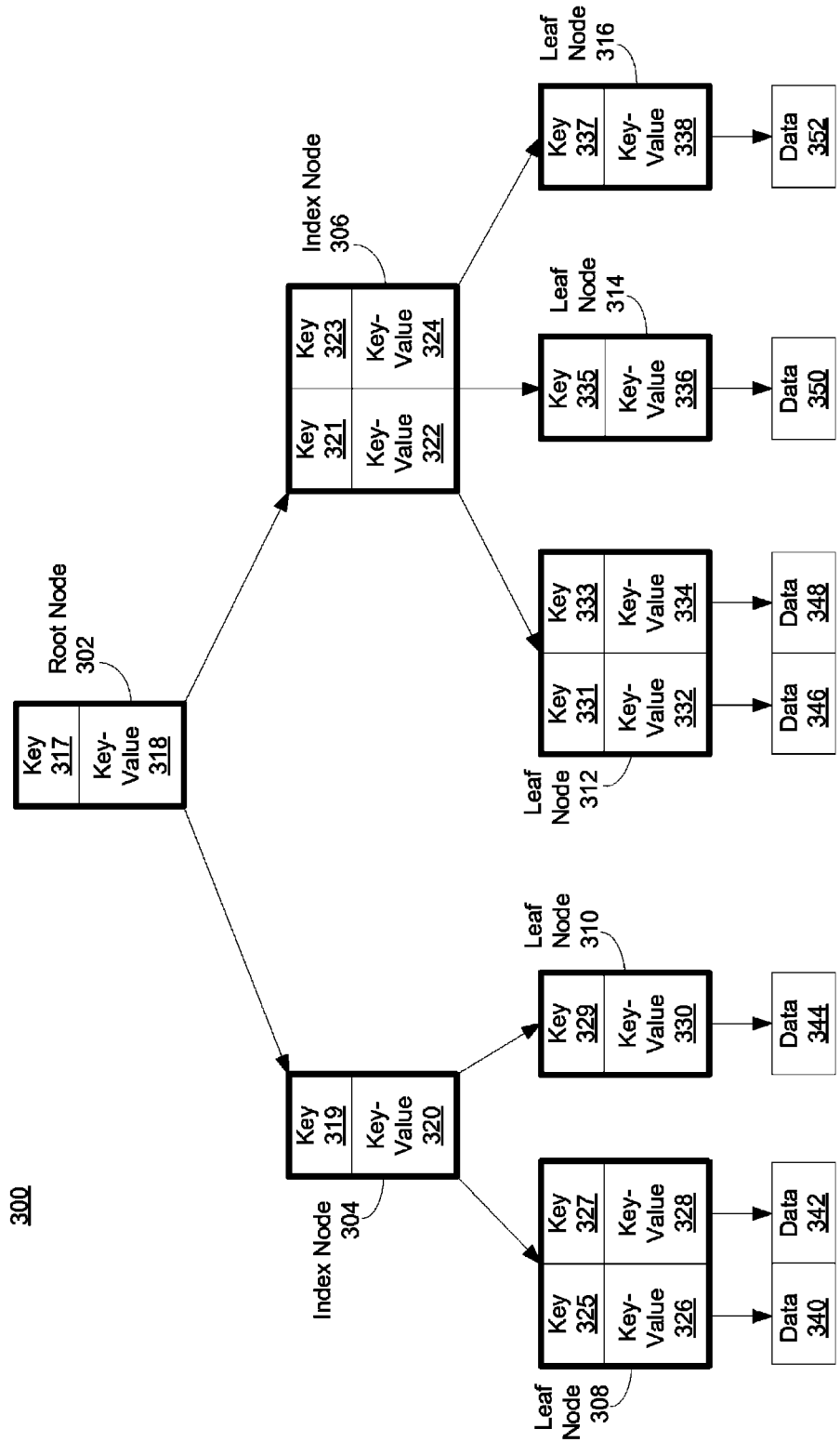
FIG. 3 is a block diagram depicting an example of a B+ tree data structure in accordance with various embodiments of the present disclosure.

FIG. 3 is a block diagram depicting an example of a B+ tree data structure 300 that can be implemented by a computing device (e.g., 210) in accordance with various embodiments of the present disclosure. The organization of the B+ tree data structure 300 can be referred to as a balanced tree. It is noted that various embodiments of the B+ tree data structure 300 enable improved performance of simple inserts within the B+ tree data structure 300. The B+ tree data structure 300 can include, but is not limited to, a root node 302, index or non-leaf nodes 304 and 306, and leaf nodes 308, 310, 312, 314, and 316. Moreover, each of the nodes of the B+ tree data structure 300 can include one or more keys and each key can include one or more key-values. Note that the key-value entries can be utilized to navigate through the B+ tree data structure 300 in order to insert, delete, and search for data. In addition, in one embodiment, each key-value entry of a leaf node can be a pointer (or metadata) to data associated with the B+ tree data structure 300. It is noted that in an embodiment, each key-value entry of a non-leaf node can include one or more pointers (or metadata) to another node within the B+ tree data structure 300.

Specifically within one embodiment, the root node 302 can include key 317 and key-value entry 318, wherein the key-value entry 318 can include a first pointer to the index node 304 and a second pointer to the index node 306. The index node 304 can include key 319 and key-value entry 320, wherein the key-value entry 320 can include a first pointer to leaf node 308 and a second pointer to the leaf node 310. The index node 306 can include key 321 and its corresponding key-value entry 322 along with key 323 and its corresponding key value entry 324. Note that in one embodiment, the key-value entry 322 can include a first pointer to the leaf node 312 and a second pointer to the leaf node 314 while the key-value entry 324 can include a pointer to leaf node 316. In an embodiment, the key-value 322 can include a pointer to the leaf node 312 while the key-value entry 324 can include a first pointer to the leaf node 314 and a second pointer to leaf node 316.

Within FIG. 3, in one embodiment each leaf node within the B+ tree data structure 300 can include a key and key-value entry, wherein the key-value entry is a pointer (or metadata) to data associated with the B+ tree data structure 300. For example, the leaf node 310 can include key 329 and key-value entry 330, wherein the key-value entry 330 is a pointer to data 344. Also, the leaf node 308 can include key 325 and key-value 326, wherein the key-value 326 is a pointer to data 340. In addition, the leaf node 308 can include key 327 and key-value 328, wherein the key-value 328 is a pointer to data 342. The leaf node 312 can include key 331 and key-value 332, wherein the key-value 332 is a pointer to data 346. Additionally, the leaf node 312 can include key 333 and key-value 334, wherein the key-value 334 is a pointer to data 348. The leaf node 314 can include key 335 and key-value entry 336, wherein the key-value 336 is a pointer to data 350. The leaf node 316 can include key 337 and key-value entry 338, wherein the key-value entry 338 is a pointer to data 352. It is pointed out that each of the key values of the B+ tree data structure 300 can be implemented as data, metadata, a mapping, a translation, and/or a pointer, but is not limited to such.

In order to more fully understand various embodiments of the B+ tree data structure 300 in accordance with the present disclosure, it is desirable to first point out the conventional organization and implementation of the key-values within the B+ tree data structure 300. Specifically, each key of a node of a conventional B+ tree data structure is maintained in a sorted order based on their key. The sort order would depend on the use case. Typically the key can have a "primary" component, a secondary component, a tertiary component, etc. The sorting would happen first on the primary component, then on the secondary component, and so on. In this manner, the keys of the nodes of a conventional B+ tree data structure are maintained in a sorted order based on their key.

Within FIG. 3, it is noted that any B+ tree data structure (e.g., 300) can be implemented by a computing device (e.g., 210) in accordance with various embodiments of the present disclosure. For example in an embodiment, the keys and their corresponding key-value entries of the B+ tree data structure 300 are not kept or maintain in a sorted order based on each key. As such, this allows all simple insertions within the B+ tree data structure 300 to update only one block of a B+ tree node. It is pointed out that in various embodiments, a block update in this manner is ensured to be atomic by disk semantics of a hard disk drive or persistent storage (e.g., fixed disk 244 or one or more storage devices 160A(1)-(N)). In one embodiment, the keys and their corresponding key-value entries of the B+ tree data structure 300 (or one of its nodes) are stored by persistent storage and are not kept or maintain in a sorted order based on each key. However, once the B+ tree data structure 300 (or one of its nodes) is fetched from persistent storage into non-persistent storage (e.g., random access memory and the like), the keys and their corresponding key-value entries of the B+ tree data structure 300 (or one of its nodes) can be sorted based on each key. If there is enough non-persistent storage, the B+ tree data structure 300 (or one of its nodes) can remain in the non-persistent storage. In this manner, look-up operations within the B+ tree data structure 300 (or one of its nodes) can be performed more quickly. Note that even after the sorting operation, the keys and their corresponding key-value entries of the B+ tree data structure 300 (or one of its nodes) that are stored by persistent storage remain in the unsorted order based on each key.

Moreover in one embodiment, the node key-value entries of the B+ tree data structure 300 are kept in a sorted order based on their keys within a disk sector of a hard disk drive, but are not limited to such. Specifically, in an embodiment, a node of the B+ tree data structure 300 can be larger than a disk sector of a hard disk drive and the node's key-value entries can be maintained in an unsorted order or fashion based on their keys. However, within each disk sector, the key-value entries of the B+ tree data structure 300 can be maintained in a sorted order or fashion based on their keys. As such, a simple insertion into the B+ tree data structure 300 can be performed at the granularity of a disk sector, thereby enabling that operation to be atomic.

Within FIG. 3, in accordance with various embodiments, some of the key-value entries of the B+ tree data structure 300 can be kept or maintained in a sorted order based on their keys for some of the nodes while other key-value entities are kept or maintained in an unsorted order based on their keys for other nodes of the B+ tree data structure 300. For example, in one embodiment, the key-value entries in the leaf nodes (e.g., 308, 310, 312, 314, and 316) of the B+ tree data structure 300 are not kept or maintained in a sorted order based on their keys while the key-value entries within the non-leaf nodes (e.g., 302, 304, and 306) of the B+ tree data structure 300 are kept or maintained in sorted order based on their keys. In one embodiment, this can be achieved by updating the non-leaf nodes through a transaction mechanism that involves writing to a transaction log.

In an embodiment, as part of managing and/or implementing the B+ tree data structure 300, the disk sector size of a hard disk drive or persistent storage of a storage system can be detected or determined in order to ensure that each node size of the B+ tree data structure 300 is the same size as the disk sector size. In this manner, any update to a node of the B+ tree 300 can be atomic based on the disk semantics of the hard disk drive or persistent storage. Furthermore, it is noted that the key-value entries of the B+ tree data structure 300 can be maintained in an unsorted order based on their keys and any changes to the node will be a single sector update. It is noted that in one embodiment, the disk sector size can be determined or detected automatically by fetching this information from the hard disk drive or persistent storage of a storage system.

Within FIG. 3, in one embodiment, the free space map updates can be done periodically (or intermittently), for example, once for multiple simple inserts to the B+ tree data structure 300. However, if the free space map updates are performed in this manner, a system crash may leak free space which can be reclaimed by doing an asynchronous scan of the whole B+ tree data structure 300. More specifically, within B+ tree 300 there are updates that are to be completed for other structures. As such, those structures can be updated in an occasional or intermittent or periodic fashion (e.g., every thousand updates the global structures can be updated). As such, input and output (I/O) operations can be reduced that are associated with the B+ tree data structure 300. It is understood that this technique in accordance with an embodiment may end up leaking some free space. However in one embodiment, a mechanism can scan the B+ tree data structure 300 and determine where the one or more leaks exist.

It is noted that various embodiments of the B+ tree data structure 300 can provide or produce different benefits. For example, one of the benefits can be that the number of inputs and outputs (I/Os) can be reduced during simple insert operations to the B+ tree data structure 300. Furthermore, another benefit can be the reduction of contention for a transaction log during simple insert operations to the B+ tree data structure 300.

Figure 4:
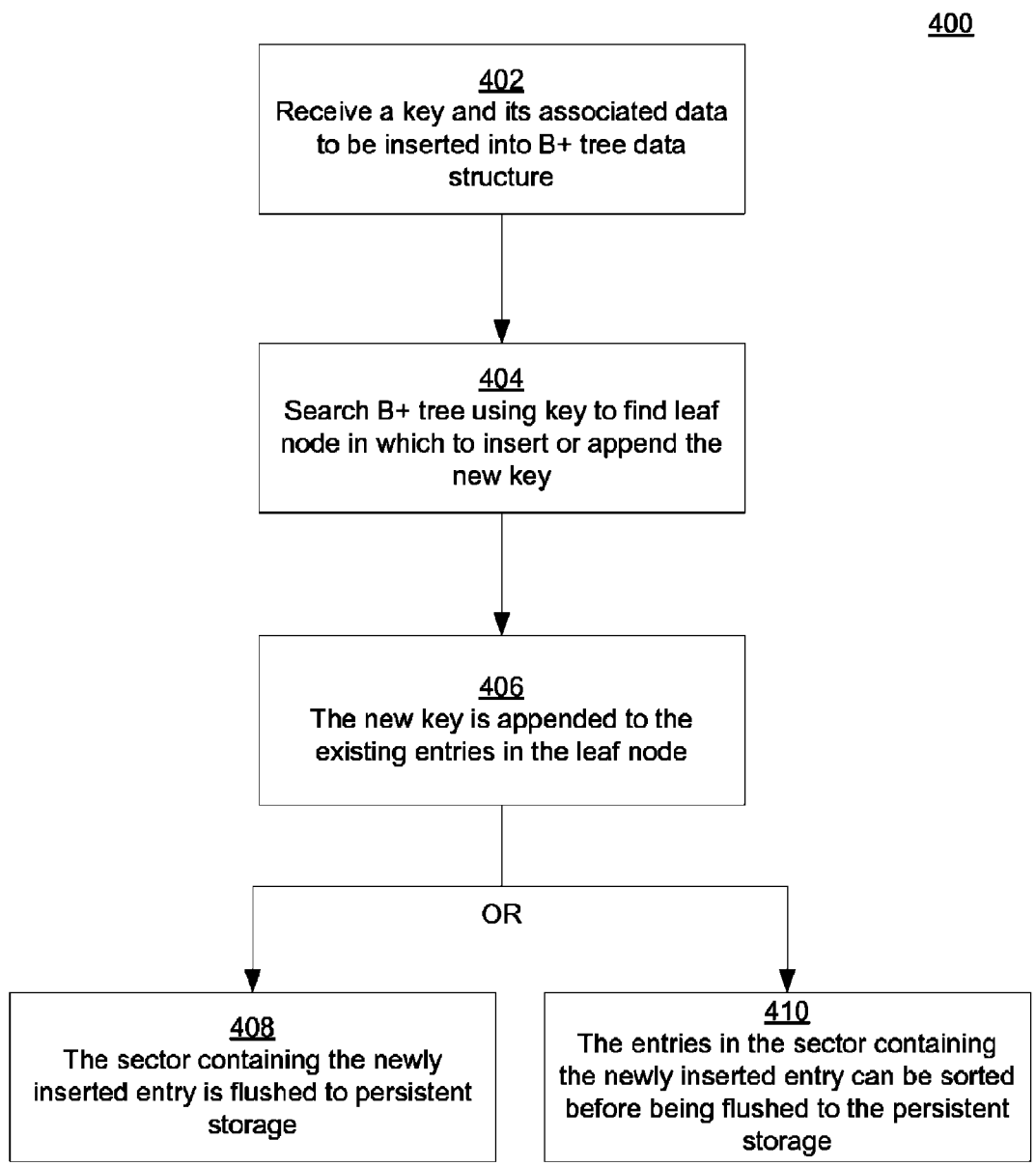
FIG. 4 is a flow diagram of method in accordance with various embodiments of the present disclosure.

FIG. 4 is a flow diagram of an example method 400 in accordance with various embodiments of the present disclosure for inserting a new entry into a B+ tree data structure (e.g., 300). Although specific operations are disclosed in flow diagram 400, such operations are examples. Method 400 may not include all of the operations illustrated by FIG. 4. Also, method 400 may include various other operations and/or variations of the operations shown by FIG. 4. Likewise, the sequence of the operations of flow diagram 400 can be modified. It is appreciated that not all of the operations in flow diagram 400 may be performed. In various embodiments, one or more of the operations of method 400 can be controlled or managed by software, by firmware, by hardware, or by any combination thereof, but is not limited to such. Method 400 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 400 can include receiving a key and its associated data to be inserted into a B+ tree data structure. The B+ tree data structure is searched using the key. This search can involve navigating through the B+ tree data structure and locating a leaf node into which the new entry is to be inserted. The new key can be appended to any existing entries in the located or identified leaf node. The sector containing the newly inserted entry can be flushed to persistent storage.

Since a sector gets written to the persistent storage atomically, the ACID (atomicity, consistency, isolation, durability) properties of the B+ tree data structure remain intact. Optionally, the entries in the sector containing the newly inserted entry can be sorted based on their key before being flushed to the persistent storage. Note that this sorting can improve the quickness of look-up operations within the B+ tree data structure. In this manner, a new entry can be inserted into a B+ tree data structure in accordance with various embodiments of the present disclosure.

At operation 402 of FIG. 4, a key (e.g., 320 or 328) can be received for insertion into a B+ tree data structure (e.g., 300). It is pointed out that operation 402 can be implemented in a wide variety of ways. For example in one embodiment, the key can be received or retrieved at operation 402 from a storage system, a database, a communication network, a computing device, an input device coupled to a computing device, but is not limited to such. Operation 402 can be implemented in any manner similar to that described herein, but is not limited to such.

At operation 404, the B+ tree data structure is searched using the received key. Note that in one embodiment this search at operation 404 can involve navigating through the B+ tree data structure and locating a leaf node (e.g., 308) into which the new entry is to be inserted or appended. It is noted that operation 404 can be implemented in a wide variety of ways. For example in an embodiment, the search using the received key at operation 404 can involve comparing the received key to one or more keys of nodes within the B+ tree data structure in order to navigate through the B+ tree data structure and locate a node. Operation 404 can be implemented in any manner similar to that described herein, but is not limited to such.

At operation 406 of FIG. 4, the new key is appended to any existing entries (e.g., key 325 and its corresponding key-value 326) in the located or identified node (e.g., leaf node 308). For instance, if the leaf node already has "p" entry, then the new key entry would be the p+1 entry of the leaf node. Note that operation 406 can be implemented in a wide variety of ways. For example, operation 406 can be implemented in any manner similar to that described herein, but is not limited to such. After the completion of operation 406, process 400 can proceed to either operation 408 or operation 410.

At operation 408, the sector containing the newly inserted entry can be flushed to persistent storage. It is pointed out that since a sector gets written to the persistent storage atomically, the ACID (atomicity, consistency, isolation, durability) properties of the B+ tree data structure remain intact. Note that the operation 408 can be implemented in a wide variety of ways. For example, operation 408 can be implemented in any manner similar to that described herein, but is not limited to such. After the completion of operation 408, the process 400 may be exited. In this fashion, a new entry can be inserted into a B+ tree data structure in accordance with various embodiments of the present disclosure.

At operation 410 of FIG. 4, the entries in the sector containing the newly inserted entry can be sorted based on their key before being flushed to the persistent storage. Note that this sorting can improve the quickness of look-up operations within the B+ tree data structure. It is noted that operation 410 can be implemented in a wide variety of ways. For example, operation 410 can be implemented in any manner similar to that described herein, but is not limited to such. After the completion of operation 410, the process 400 may be exited. In this manner, a new entry can be inserted into a B+ tree data structure in accordance with various embodiments of the present disclosure.

Figure 5:
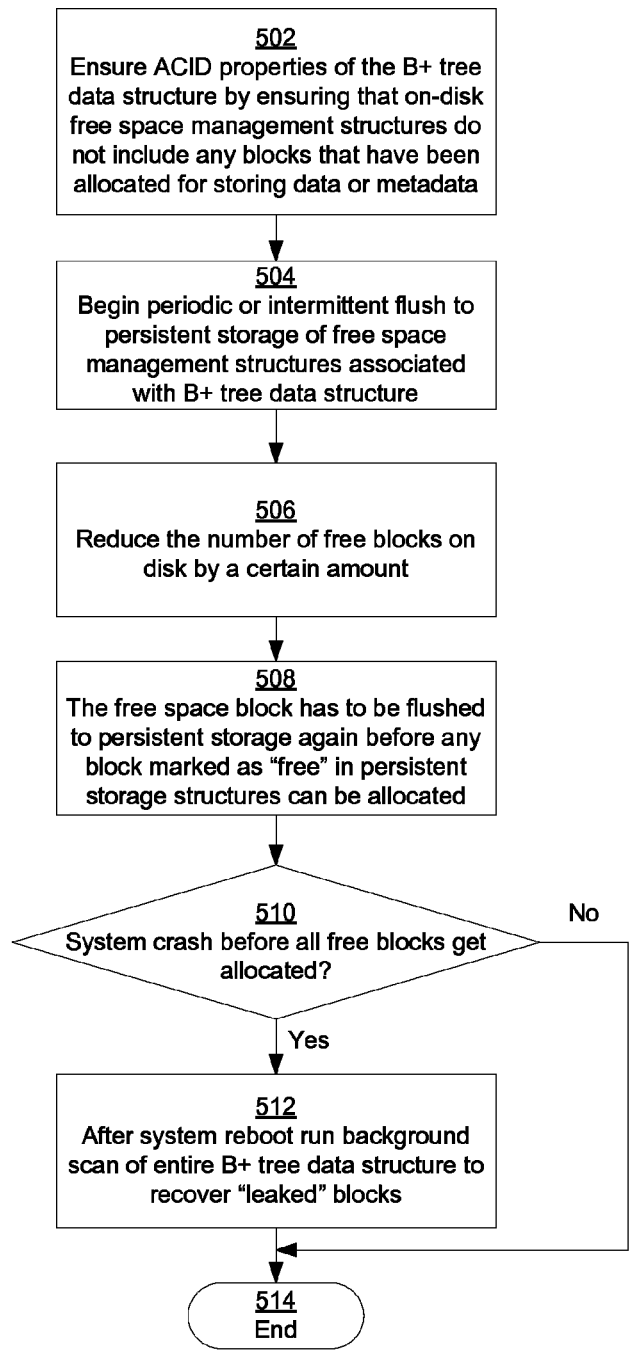
FIG. 5 is a flow diagram of another method in accordance with various embodiments of the present disclosure.

FIG. 5 is a flow diagram of an example method 500 in accordance with various embodiments of the present disclosure for performing a "lazy" or periodic or intermittent flush of free space management structures associated with a B+ tree data structure (e.g., 300). Although specific operations are disclosed in flow diagram 500, such operations are examples. Method 500 may not include all of the operations illustrated by FIG. 5. Also, method 500 may include various other operations and/or variations of the operations shown by FIG. 5. Likewise, the sequence of the operations of flow diagram 500 can be modified. It is appreciated that not all of the operations in flow diagram 500 may be performed. In various embodiments, one or more of the operations of method 500 can be controlled or managed by software, by firmware, by hardware, or by any combination thereof, but is not limited to such. Method 500 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 500 can include ensuring ACID (atomicity, consistency, isolation, durability) properties of a B+ tree data structure by ensuring that on-disk free space management structures do not include any blocks that have been allocated for storing data or metadata. In addition, a periodic or intermittent flush to disk or persistent storage can begin of the free space management structures associated with the B+ tree data structure. Furthermore, the number of free blocks can be reduced by a certain amount. The free space block has to be flushed to disk or persistent storage again before allocation of any blocks marked as "free" in on-disk structures. A determination can be made as to whether a system crash occurred before allocation of all the free blocks. If not, process 500 can be ended. However, if it is determined that there was a system crash before allocation of all the free blocks, a background scan can be run after system reboot of the entire B+ tree data structure to recover "leaked" blocks. After completed, process 500 can be ended. In this manner, a "lazy" or periodic or intermittent flush can be performed of free space management structures associated with a B+ tree data structure.

The following example illustrates an embodiment of performing a "lazy" or periodic or intermittent flush of a free space management structures associated with a B+ tree data structure (e.g., 300). For example, the free space management structure associated with the B+ tree data structure can have 100 blocks. The free space management structure can be flushed to disk or persistent storage by reducing the free blocks by ten at a time. As such, after a first flush to disk or persistent storage is completed, the free space management structure would have 90 blocks. In addition, after a second flush to disk or persistent storage is completed, the free space management structure would have 80 blocks, and so on. In one embodiment, the flush to disk or persistent storage of the free space management structure can be initiated if ten blocks have already been allocated since the last flush and an eleventh block is to be allocated. However, the free space management structure could be proactively flushed to disk or persistent storage. For example in an embodiment, a flush to disk of the free space management structure can be initiated after allocation of eight blocks, but is not limited to such. It is noted that one or more blocks can be implemented instead of the eight blocks previously mentioned.

At operation 502 of FIG. 5, ACID (atomicity, consistency, isolation, durability) properties can be ensured for a B+ tree data structure (e.g., 300) by ensuring that on-disk (or persistent storage) free space management structures do not include any blocks that have been allocated for storing data or metadata. Note that operation 502 can be implemented in a wide variety of ways. For example in one embodiment, the on-disk free space management structures can be monitored to ensure that it does not include any blocks that have been allocated for storing data or metadata. Operation 502 can be implemented in any manner similar to that described herein, but is not limited to such.

At operation 504, a periodic or intermittent flush to disk or persistent storage can begin of the free space management structures stored by non-persistent storage associated with the B+ tree data structure. It is pointed out that operation 504 can be implemented in a wide variety of ways. For example in an embodiment, the periodic or intermittent flush to disk or persistent storage at operation 504 can begin based on one or more conditions (e.g., elapse of a defined amount of time, allocation of a defined number of blocks, and/or the like). Operation 504 can be implemented in any manner similar to that described herein, but is not limited to such.

At operation 506 of FIG. 5, the number of free blocks of the free space management structures can be reduced by a certain amount. It is noted that operation 506 can be implemented in a wide variety of ways. For example in one embodiment, the number of free blocks at operation 506 can be a predefined number of blocks, a number of blocks within a defined range, but is not limited to such. In an embodiment, note that at operation 506, the free space management structures storage by persistent storage (also know as persistent storage free space management structures) do not indicate a larger number of blocks to be free than the actual number of free blocks which is indicated by the corresponding free space management structures stored by non-persistent storage (also know as non-persistent storage free space management structures). Operation 506 can be implemented in any manner similar to that described herein, but is not limited to such.

At operation 508, the free space block has to be flushed to disk or persistent storage again before allocation of any blocks marked as "free" in on-disk structures. Note that operation 508 can be implemented in a wide variety of ways. For example, operation 508 can be implemented in any manner similar to that described herein, but is not limited to such.

At operation 510 of FIG. 5, a determination can be made as to whether a system crash occurred before allocation of all the free blocks. If not, process 500 can proceed to operation 514. However, if it is determined at operation 510 that there was a system crash before allocation of all the free blocks, process 500 can proceed to operation 512. It is pointed out that operation 510 can be implemented in a wide variety of ways. For example in an embodiment, a monitor can be implemented to detect a system crash at operation 510 while also monitoring the number of free blocks remaining for allocation. Operation 510 can be implemented in any manner similar to that described herein, but is not limited to such.

At operation 512, a scan can be run after system reboot of the entire B+ tree data structure to recover "leaked" blocks. It is noted that operation 512 can be implemented in a wide variety of ways. For example in one embodiment, the scan at operation 512 can be implemented as, but is not limited to, a background scan, an asynchronous scan, and the like. Operation 512 can be implemented in any manner similar to that described herein, but is not limited to such.

At operation 514 of FIG. 5, process 500 can be ended. In this manner, a "lazy" or periodic or intermittent flush can be performed of free space management structures associated with a B+ tree data structure.

Figure 6:
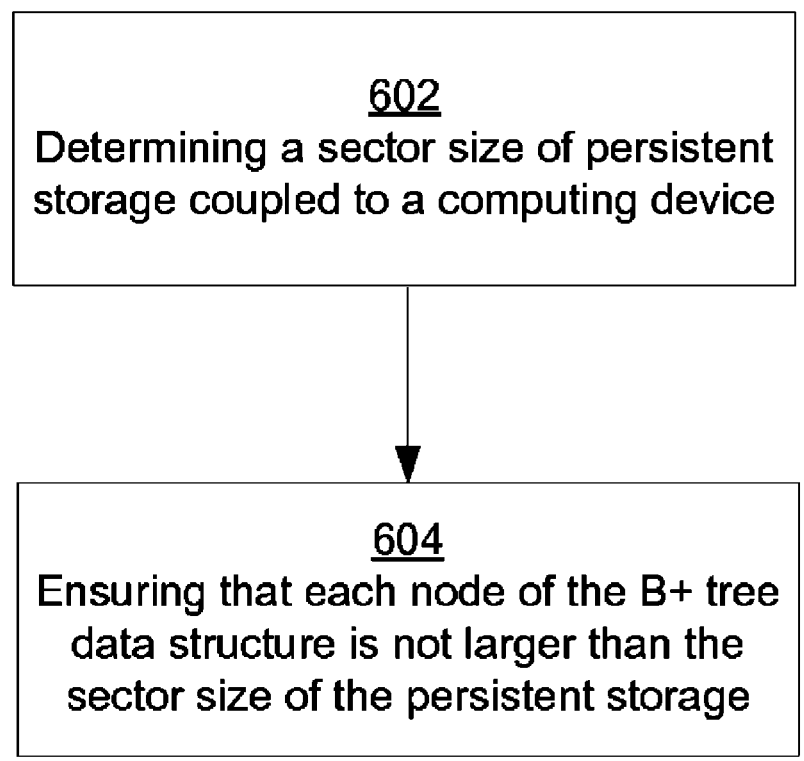
FIG. 6 is a flow diagram of yet another method in accordance with various embodiments of the present disclosure.

FIG. 6 is a flow diagram of an example method 600 in accordance with various embodiments of the present disclosure for managing a B+ tree data structure (e.g., 300). Although specific operations are disclosed in flow diagram 600, such operations are examples. Method 600 may not include all of the operations illustrated by FIG. 6. Also, method 600 may include various other operations and/or variations of the operations shown by FIG. 6. Likewise, the sequence of the operations of flow diagram 600 can be modified. It is appreciated that not all of the operations in flow diagram 600 may be performed. In various embodiments, one or more of the operations of method 600 can be controlled or managed by software, by firmware, by hardware, or by any combination thereof, but is not limited to such. Method 600 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 400 can include determining a sector size of persistent storage (e.g., a hard disk drive) coupled to a computing device. Furthermore, it can be ensured that each node of the B+ tree data structure is not larger than the sector size of the persistent storage coupled to the computing device. In this manner, a B+ tree data structure can be managed in accordance with various embodiments of the present disclosure.

At operation 602 of FIG. 6, a determination can be made of a sector size of persistent storage (e.g., hard disk drive 244) coupled to a computing device (e.g., 210). It is noted that operation 604 can be implemented in a wide variety of ways. For example, operation 604 can be implemented in any manner similar to that described herein, but is not limited to such.

At operation 604, it can be ensured that each node of a B+ tree data structure (e.g., 300) is not larger than (or is the same size as) the sector size of the persistent storage. It is pointed out that operation 604 can be implemented in a wide variety of ways. For example, module 299 at operation 604 can monitor and manage the B+ tree data structure to ensure that the each node is not larger than (or is the same size as) the sector size of the persistent storage. The operation 604 can be implemented in any manner similar to that described herein, but is not limited to such. In this fashion, a B+ tree data structure can be managed in accordance with various embodiments of the present disclosure.

Figure 7:
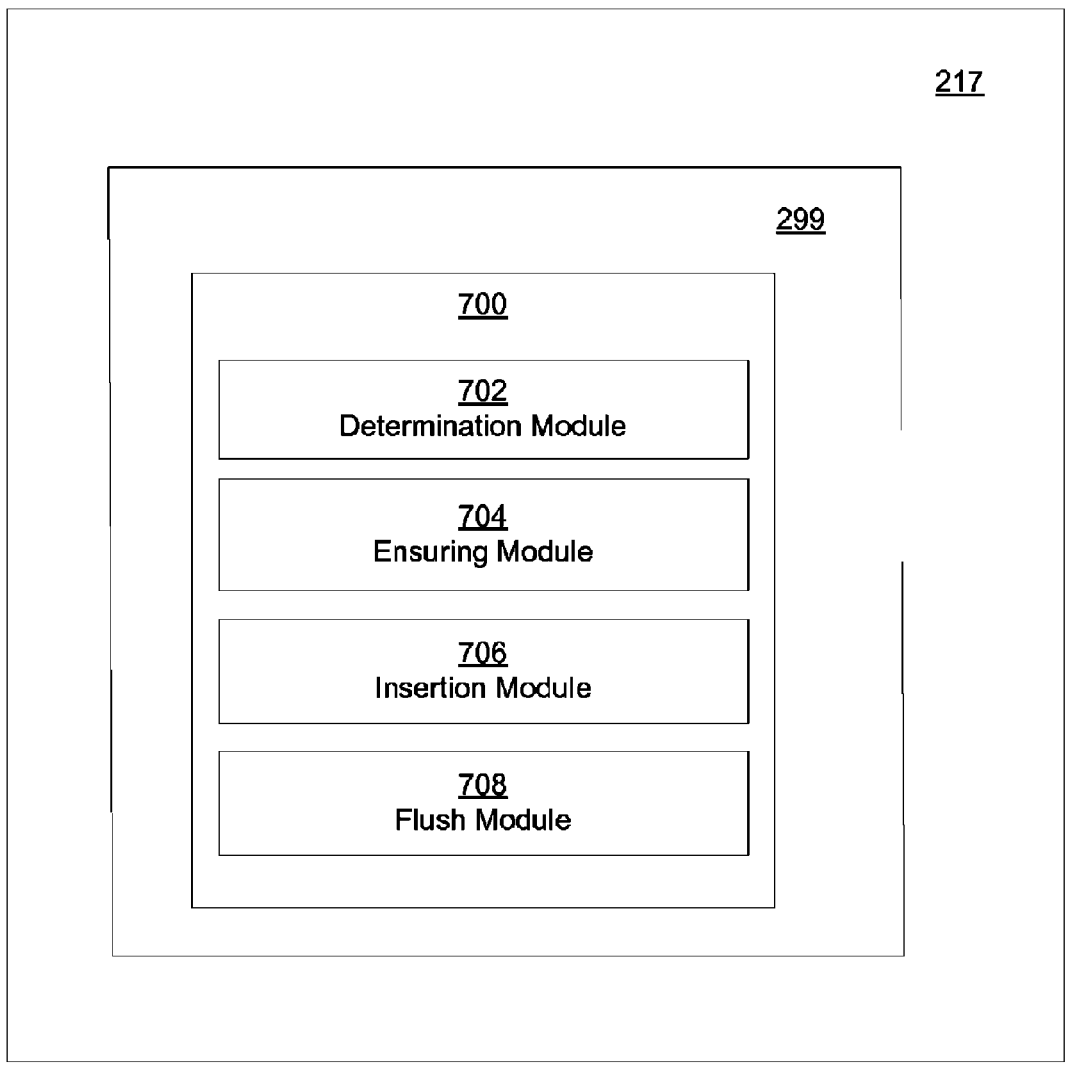
FIG. 7 is a block diagram of modules in accordance with various embodiments of the present disclosure.

FIG. 7 is a block diagram of an example module 700 in accordance with various embodiments of the present disclosure. In an embodiment, the module 700 can include instructions stored on a computer readable medium. In addition, the module 700 can be part of the module 299 (described herein), which may be stored within the system memory 217. The module 700 can include, but is not limited to, a determination module 702, an ensuring module 704, an insertion module 706, and a flush module 708.

Specifically, the determination module 702 can include instructions for determination the sector size of persistent storage, such as, a hard disk drive (e.g., method 600, and the like). In addition, the ensuring module 704 can include instructions for ensuring that each node of the B+ tree data structure is not larger than (or is the same size as) the sector size of the persistent storage (e.g., method 600, and the like). Furthermore, the insertion module 706 can include instructions for inserting a new entry into a B+ tree data structure (e.g., method 400, and the like). The flush module 708 can include instructions for performing a periodic or intermittent flush of free space management structures associated with a B+ tree data structure (e.g., method 500, and the like). It is appreciated that the determination module 702, the ensuring module 704, the insertion module 706, and the flush module 708 can be implemented as part of a variety of environments. For example, the determination module 702, the ensuring module 704, the insertion module 706, and the flush module 708 can be implemented as part of, but not limited to, a distributed computing environment, a cloud computing environment, a client server environment, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
receiving a key and associated data via a computing device;
searching a B+ tree data structure using the key to find a target leaf node, wherein the B+ tree data structure is stored by a persistent storage coupled to the computing device, wherein the B+ tree data structure comprises a plurality of leaf nodes, wherein each leaf node of the plurality of leaf nodes is not maintained in a sorted order based on its key, and wherein each leaf node corresponds to a size of a sector of the persistent storage;
appending the key and associated data to the target leaf node in an atomic operation;
flushing the target leaf node to a target sector of the persistent storage in an atomic operation; and
flushing a first free space management structure associated with the B+ tree data structure to the persistent storage intermittently, wherein the first free space management structure indicates a first number of free blocks.

2. The method of claim 1, further comprising:
detecting the sector size of the persistent storage; and
ensuring that each leaf node of the plurality of leaf nodes of the B+ tree data structure is not larger than the sector size of the persistent storage.

3. The method of claim 1, wherein the flushing comprises reducing a second number of free blocks of a second free space management structure on the persistent storage, wherein the reduced second number of free blocks is not greater than the first number of free blocks.

4. A non-transitory computer readable storage medium having stored thereon, computer-executable instructions that when executed by a computing device cause the computing device to perform a method comprising:
receiving a key and associated data via the computing device;
searching a B+ tree data structure using the key to find a target leaf node, wherein the B+ tree data structure is stored by a persistent storage coupled to the computing device, wherein the B+ tree data structure comprises a plurality of leaf nodes, wherein each leaf node of the plurality leaf nodes is not maintained in a sorted order based on its key, and wherein each leaf node corresponds to a size of a sector of the persistent storage;
appending the key and associated data to the target leaf node in an atomic operation;
flushing the target leaf node to a target sector of the persistent storage in an atomic operation; and
flushing a first free space management structure associated with the B+ tree data structure to the persistent storage intermittently, wherein the first free space management structure indicates a first number of free blocks.

5. The non-transitory computer readable storage medium of claim 4, wherein the B+ tree data structure further comprises a plurality of non-leaf nodes, wherein each non-leaf node of the plurality of non-leaf nodes is maintained in a sorted order based on its key.

6. The non-transitory computer readable storage medium of claim 4, wherein the method performed by the computing device further comprises:
detecting the sector size of the persistent storage; and
ensuring that each leaf node of the plurality of leaf nodes of the B+ tree data structure is not larger than the sector size of the persistent storage.

7. The non-transitory computer readable storage medium of claim 4, wherein the flushing comprises reducing a second number of free blocks of a second free space management structure on the persistent storage, wherein the reduced second number of free blocks is not greater than the first number of free blocks.

8. A computer system comprising:
a processor; and
computer readable storage media coupled to the processor and having stored therein instructions that, if executed by the computer system cause the computer system to execute a method comprising:
receiving a key and associated data via a computing device;
searching a B+ tree data structure using the key to find a target leaf node, wherein the B+ tree data structure is stored by a persistent storage coupled to the computing device, wherein the B+ tree data structure comprises a plurality of leaf nodes, wherein each leaf node of the plurality leaf nodes is not maintained in a sorted order based on its key, and wherein each leaf node corresponds to a size of a sector of the persistent storage;
appending the key and associated data to the target leaf node in an atomic operation;
flushing the target leaf node to a target sector of the persistent storage in an atomic operation; and
flushing a first free space management structure associated with the B+ tree data structure to the persistent storage intermittently, wherein the first free space management structure indicates a first number of free blocks.

* * * * *